US008851502B2

(12) United States Patent
Gaudiano et al.

(10) Patent No.: US 8,851,502 B2
(45) Date of Patent: Oct. 7, 2014

(54) LOCKABLE WALKER

(75) Inventors: Ronald B. Gaudiano, Manhattan Beach, CA (US); Chi Chung (Richard) Loo, Temple City, CA (US)

(73) Assignee: Nova Ortho-Med

( * ) Notice: Subject to any disclaimer, the term of this patent is extended or adjusted under 35 U.S.C. 154(b) by 341 days.

(21) Appl. No.: 13/038,263

(22) Filed: Mar. 1, 2011

(65) Prior Publication Data

US 2012/0223509 A1 Sep. 6, 2012

(51) Int. Cl.
*B62B 1/00* (2006.01)
*A61H 3/00* (2006.01)

(52) U.S. Cl.
USPC .............................. 280/647; 280/642; 135/67

(58) Field of Classification Search
USPC ............ 280/647, 642, 87.041, 87.021, 87.03, 280/87.051; 16/345, 352, 374; 135/67, 85
See application file for complete search history.

(56) References Cited

U.S. PATENT DOCUMENTS

| | | | | |
|---|---|---|---|---|
| 2,732,004 | A * | 1/1956 | Forbes | 482/67 |
| 2,996,070 | A * | 8/1961 | Ries | 135/67 |
| 3,658,079 | A * | 4/1972 | Block | 135/67 |
| 3,688,789 | A * | 9/1972 | Bunch | 135/67 |
| 4,121,798 | A * | 10/1978 | Schumacher et al. | 248/113 |
| 4,411,283 | A * | 10/1983 | Lucarelli | 135/67 |
| 4,619,282 | A * | 10/1986 | Battiston | 135/67 |
| 4,640,301 | A * | 2/1987 | Battiston et al. | 135/67 |
| 4,729,395 | A * | 3/1988 | Adamson | 135/67 |
| 5,255,696 | A | 10/1993 | Leonard | |
| 6,318,392 | B1 * | 11/2001 | Chen | 135/67 |
| 6,494,469 | B1 | 12/2002 | Hara et al. | |
| 7,066,484 | B2 * | 6/2006 | Willis et al. | 280/642 |
| 7,179,200 | B1 * | 2/2007 | Wu | 482/51 |
| 7,377,285 | B2 * | 5/2008 | Karasin et al. | 135/67 |
| 7,497,226 | B2 | 3/2009 | Li et al. | |
| 7,523,950 | B2 | 4/2009 | Meyers et al. | |
| 7,628,411 | B2 * | 12/2009 | Meyers et al. | 280/87.021 |
| 7,703,465 | B2 | 4/2010 | Diamond | |
| 7,726,327 | B2 | 6/2010 | Battiston | |
| 7,926,834 | B2 * | 4/2011 | Willis | 135/67 |
| 8,434,780 | B2 * | 5/2013 | Li | 280/639 |
| 8,439,376 | B2 * | 5/2013 | Willis et al. | 280/87.021 |
| 8,511,694 | B2 * | 8/2013 | Bradshaw et al. | 280/87.021 |
| 8,562,007 | B2 * | 10/2013 | Menichini | 280/87.05 |
| 8,573,613 | B2 * | 11/2013 | Liu | 280/87.021 |
| 8,584,689 | B2 * | 11/2013 | Catton | |
| 8,646,804 | B2 * | 2/2014 | Derks et al. | 280/648 |
| 2007/0199586 | A1 | 8/2007 | Chang | |
| 2007/0227570 | A1 | 10/2007 | Gale et al. | |
| 2007/0235067 | A1 * | 10/2007 | Gale et al. | 135/67 |
| 2008/0202571 | A1 | 8/2008 | Meyers et al. | |

* cited by examiner

*Primary Examiner* — J. Allen Shriver, II
*Assistant Examiner* — James M Dolak
(74) *Attorney, Agent, or Firm* — Lewis Brisbois

(57) ABSTRACT

A lockable walker and a lock for use with a walker the lock including a constricted, U-shaped clasping region, a projection and an abutment shoulder, with the constricted, U-shaped clasping region snap fitting over the front leg or rear leg of a walker and slidably movable along the front leg or rear leg of the walker, so that when the walker is folded up and the lock is moved upward toward a leg extension that forms an offset hinge or pivot connecting the front and rear legs of the walker, a projection member of the lock is inserted into an opening formed by the leg extension and walker legs to thereby locked the walker in a storage position so that the walker legs cannot spontaneously unfold.

1 Claim, 6 Drawing Sheets

LOCKABLE WALKER

FIELD OF INVENTION

The invention relates generally to the field of walkers for use by individuals whose walking is impaired and who benefit from use of a walker.

BACKGROUND

Walkers are well known and have been commercially available for approximately twenty years. Typically, conventional walkers have a storage position or configuration and a use position or configuration. In the storage or non-use position, the walker's legs are folded together to minimize space occupied by the walker and to facility storage in various locations such as a vehicle or closet. In the "use" position the legs are extended to provide a wider base for the legs and thus to provide for stability.

A well known problem with walkers in the storage position is that the legs tend to spontaneously expand or unfold when in the storage position and when the walker is being put into or taken out of storage. This unplanned expansion or unfolding of the walker is a source of annoyance, inconvenience and difficulty to the user or the user's caregiver. Typical solutions to eliminate or minimize this problem are the use of bungee cords, straps and/or ropes. However, these solutions have their own associated problem(s). For example they are typically kept separate from the walker and can be lost or misplaced, as well as out of reach when needed.

SUMMARY

Lockable walkers and locks for use in walkers according to the present invention overcome the drawbacks of known walkers by providing simple, effective locking for walkers. The preferred lock is of a unitary construction that preferably includes a U-shaped clasping region having a constriction or narrowing at the open end of the "U", a projection and an abutment shoulder. The constricted, U-shaped clasping region snap fits over the front leg or rear leg of a walker and is slidably movable along the front leg of the walker. In preferred embodiments, the lock includes tabs in the back of the lock, as well as partially rounded, and partially cut-away regions at the distal ends of the U-shaped clasping regions to facilitate each of installation of the lock on the leg of a walker or removal of the lock from the leg of a walker. When the lock is moved upward toward the leg extension that forms an offset hinge or pivot that connects the front and rear legs and the projection member of the lock is inserted into the channel or opening formed by the sides of two leg extension members and the front and rear legs, the walker is thereby placed in a locked position. In the locked position the legs cannot spontaneously unfold or expand. When the user or caregiver wants to use the walker, the lock is simply moved downward, out of the channel or opening, to free the rear leg to rotate outward for placing the walker in the use position.

These and other embodiments, features, aspects, and advantages of the invention will become better understood with regard to the following description, appended claims and accompanying drawings.

BRIEF DESCRIPTION OF THE DRAWINGS

The foregoing aspects and the attendant advantages of the present invention will become more readily appreciated by reference to the following detailed description, when taken in conjunction with the accompanying drawings, wherein.

Reference symbols or names are used in the Figures to indicate certain components, aspects or features shown therein. Reference symbols common to more than one Figure indicate like components, aspects or features shown therein.

DETAILED DESCRIPTION

In accordance with FIGS. 1-9 and the following written description embodiments of preferred lockable walkers and preferred locks adapted for use in conventional walkers are described. As shown in the accompanying figures, walkers and their components will be described from a frame of reference in which the FIG. 1 walker is shown from the front, with the front indicating the front of the walker as it moves forward while being pushed by a user who is walking forward and holding the handles of the walker.

Figure 1:
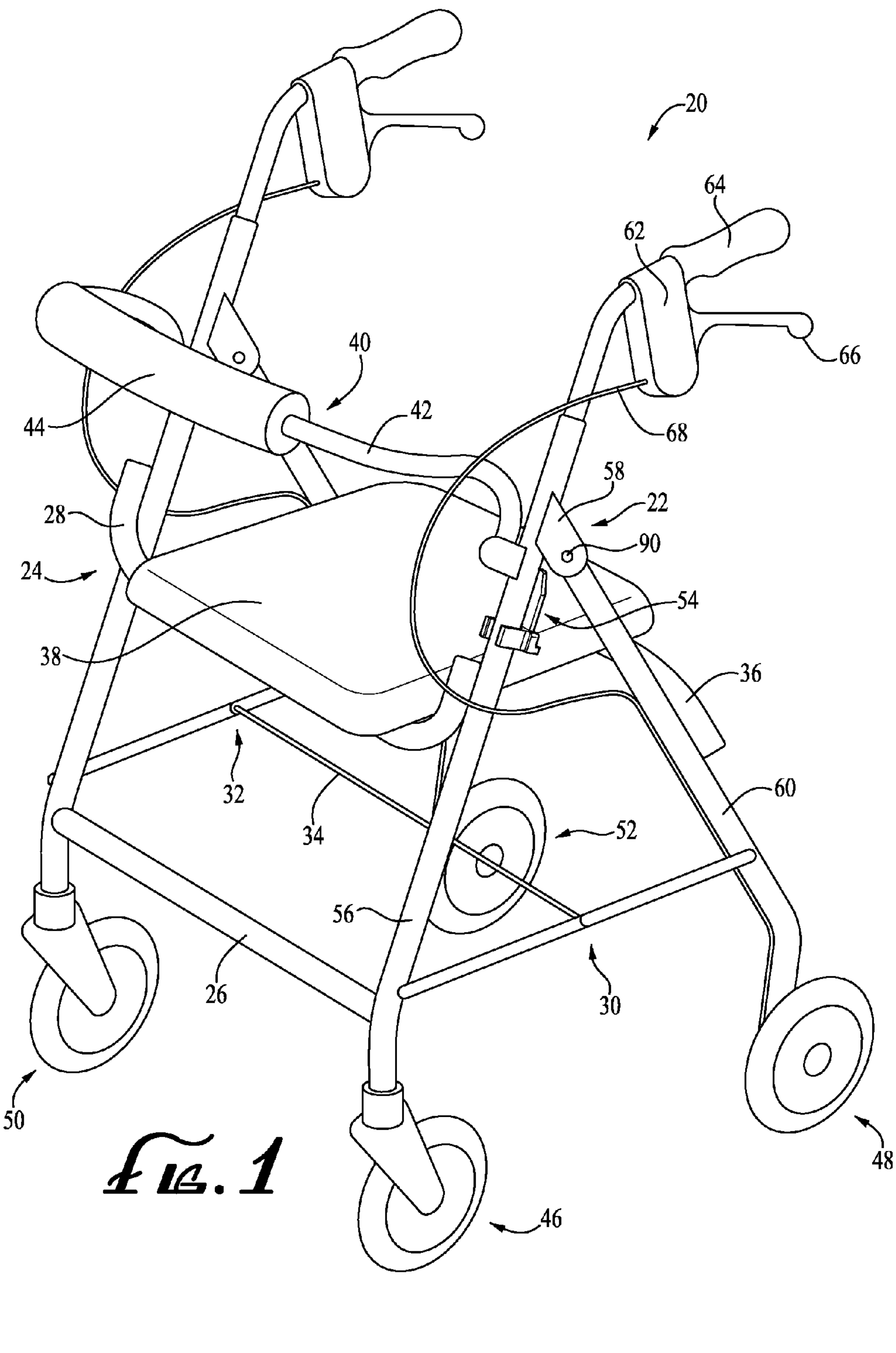
FIG. 1 is a perspective view of a preferred lockable walker taken from the front, left side.

With reference to FIG. 1 a walker 20 is shown. Walker 20 includes a left frame assembly 22, a right frame assembly 24, a front cross beam 26, a front seat support beam 28, a left collapsible, jointed, segmented rod support 30, a right collapsible, jointed, segmented rod support 32 and a connecting rod 34. The walker 20 also includes a rear seat support beam 36 and a seat 38 that is removably positioned on beams 28 and 36. A back rest 40 includes a cushion 44 that is positioned on a contoured back rest bar 42 and connected to left frame assembly 22 and right frame assembly 24. The walker is provided with front left wheel 46 and rear left wheel 48 that are fixed to and positioned at the bottom of the left frame assembly for rotation about a front axle and a rear axle. Corresponding right front wheel 50 and right rear 52 are provided for the right frame assembly 24.

The walker 20 is also provided with a lock 54 that is movably positioned on front leg 56 of the left frame assembly 22. During a locking operation the lock 54 is moved from an unlocked position on the leg 56 to a locked position in which a portion of the lock is positioned within a space, channel or region formed by rear leg extension hinge member 58, front leg 56 and rear leg 60 of the left frame assembly 22, as will be described in greater detail. The lock 54 may also be positioned on the corresponding front leg and in a corresponding position on the right frame assembly 24. Locks may also be placed on both the left and right sides of the walker.

The walker 20 also preferably includes a braking system or assembly, with a left brake assembly operatively attached to the left frame 22, and a corresponding right brake assembly (not numbered) operatively attached to the right frame 24. As is well known, various models of walkers do not have any hand brake or any other type of braking capability. The presently described locks may be used with such walkers as well as with the preferred walker having a hand brake. In further detail the left brake assembly preferably includes an actuator 62 that is attached to the upper part of front leg 56 and adjacent to left frame handle 64. The actuator 62 includes brake hand grip 66, which, upon squeezing pulls the cord or cable 68 to cause brake pads (not shown) clamp down and exert a braking force on the left rear wheel 48.

Referring now to FIGS. 2-6 a preferred lock 54 will be described. Lock 54 is preferably made of a rigid organic, polymeric material that is durable and sufficiently sturdy to withstand years of use without failure. The lock also a frame contacting surface that is relatively smooth and slippery so that it can be reciprocated up and down along a leg of a walker frame from an unengaged or unlocked position to an engaged or locked position, and vice versa. The lock 54 material of construction also has sufficient flexibility so as to permit a force fit of its frame leg engaging u-shaped clasping structure around the leg of a walker and then to return to its original, un-flexed condition once it has been fit on the walker leg. The most preferred material for the lock is polyoxymethylene, also referred to by is registered trademark, Delrin®. Once installed on the leg of a walker, the walker lock remains firmly and securely clasped to a leg of the walker, but due to its dimensioning, material of construction and smooth surface may be relatively easily slid or reciprocated along the walker frame leg by a user of the walker or a user's care provider. In this context a user may refer to the person who is the end user of the walker, or to some other person, such as a health care worker, friend, or other care provider who simply makes the walker ready for use by taking it out of a storage configuration during which the walker is in a locked position, unlocking the walker and then placing it in a configuration for use by the end user.

Figure 2:
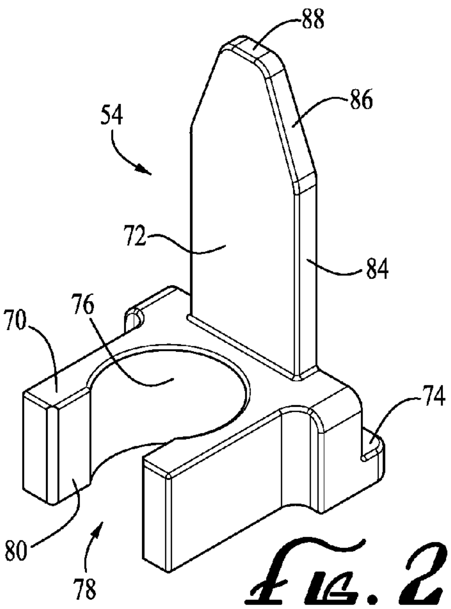
FIG. 2 is a perspective view of a preferred walker lock taken from the front, left side.
Figure 3:
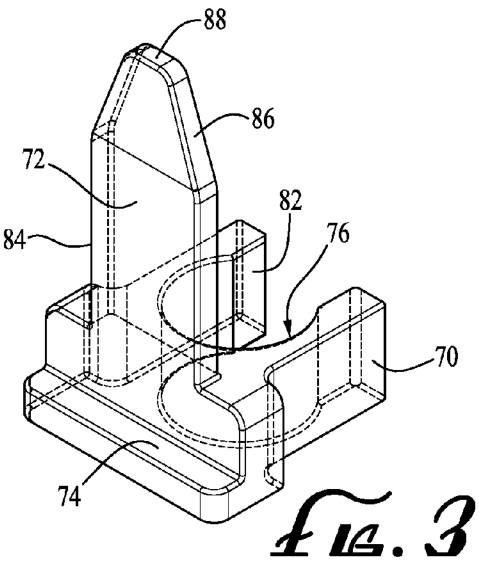
FIG. 3 is a perspective view of the FIG. 2 lock taken from the rear, right side and with dashed lines to shown hidden features.
Figure 4:
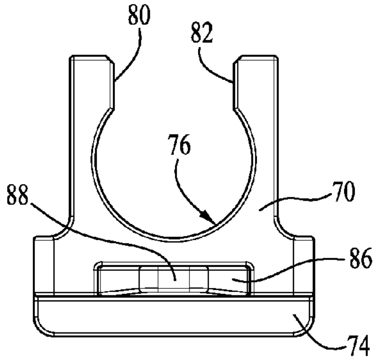
FIG. 4 is a top view of the FIG. 2 lock.
Figure 5:
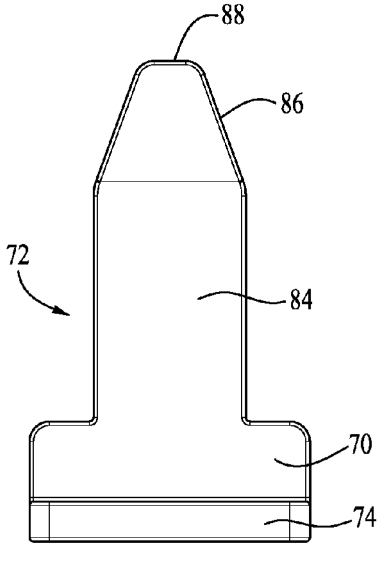
FIG. 5 is a back view of the FIG. 2 lock.
Figure 6:
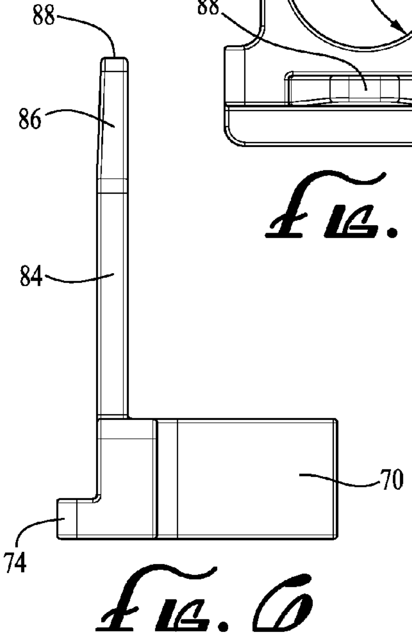
FIG. 6 is a side view of the FIG. 2 lock.

As shown in FIG. 2 the lock 54 includes a base 70, a projection 72 that extends generally at an angle of 90° from the top surface of the base 70 and a shoulder 74 that preferably has a height that is less than the height of the base 70, a length that is less that the length of the base 70 and extends in a direction that is generally about 180° from the direction of extension of the base 70. As shown in FIGS. 1-2, base 70 extends in a forward direction, or in a direction toward the front of the walker 20, projection 72 extends upward, at a 90° angle from the base 70, and shoulder 74 extends rearwardly from the base 70, preferably at about 90° from the upward, or vertical direction in which the projection 72 extends. The base, projection and shoulder are preferably of a unitary structure, most preferably a single, plastic molded structure, although the lock could be made of several components that are fastened together.

Referring primarily to FIGS. 1-4, base 70 of the lock 54 is generally a U-shaped configuration with the open end of the "U" narrowed or constricted to provide for a gripping or clasping function that securely fastens the lock to a leg of the walker, but also permits the lock to be moved along the length of the leg. The bottom part of the U preferably has a contour 76 that is complementary to the outer contour of the walker leg about which it will clasp. In the most preferred embodiment, the walker leg will be round, with a predetermined outer diameter and the bottom part 76 of the U will also round, having a radius of curvature that will complement the leg outer diameter and will form a snug or tight fit once installed on the leg of the walker. In one preferred embodiment the radius of curvature is 0.551 inches. The U-shaped base 70 preferably has a constricted or pinched area 78 at the open end of the U, such that the distance between the opposed, facing distal ends 80, 82 of the U is less than the diameter across the bottom part of the U. For example, in a preferred embodiment where the radius of curvature of the bottom part of the U is 0.551 inches, the diameter would be about 1.102 inches and the preferred distance between the distal ends or opposed faces of the distal ends of the legs of the U would be about 0.075+/− inches. The dimensions of the bottom and sides of the U as well as the overall dimensions of the base can vary, of course, so long as those dimensions yield a base that will function for its intended purpose on a specific walker. The base functions to hold projection 72 and to permit the lock 54 to be force-fit onto one of the legs of the walker and then to be movably retained on the leg, so that the lock 54 can be moved along the leg from an unlocked position to a locked position, and vice versa. Preferably the base, projection and shoulder have rounded, chamfered, beveled or smooth edges so as to avoid having sharp edges that might pose a risk of cutting to a user. Rounded edges are preferably and shown in the FIGS. 2-6 embodiment. The radius of curvature is preferably one that is esthetically pleasing and functions to eliminate sharp edges and corners on the lock.

Figure 9:
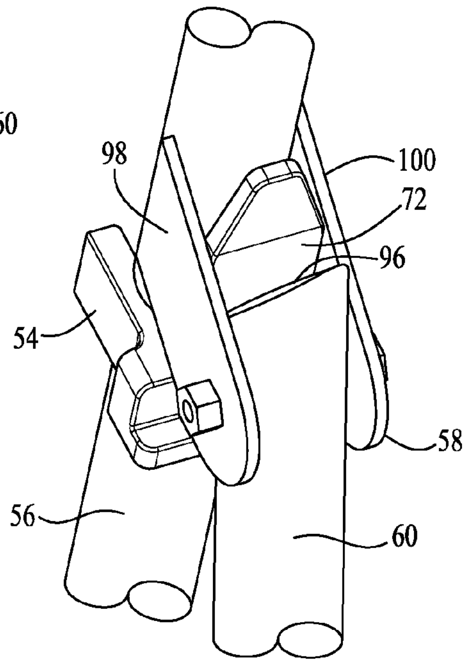
FIG. 9 is a close up perspective view of the lock projection member as positioned in a channel or opening formed by the two legs and two leg extension members of the walker.
Figure 10:
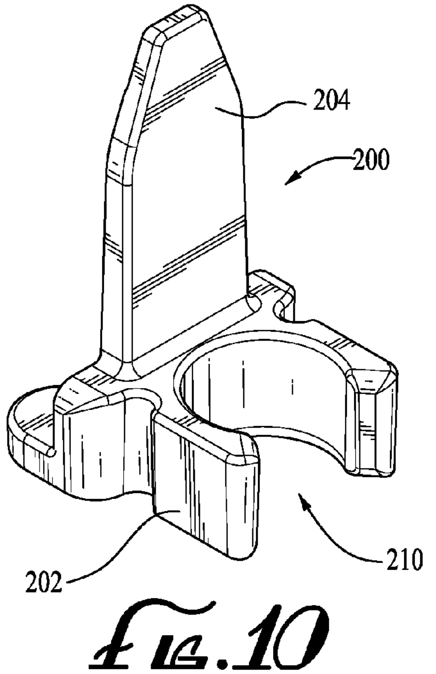
FIG. 10 is a perspective view of an alternate embodiment, preferred walker lock taken from the front, right side.
Figure 11:
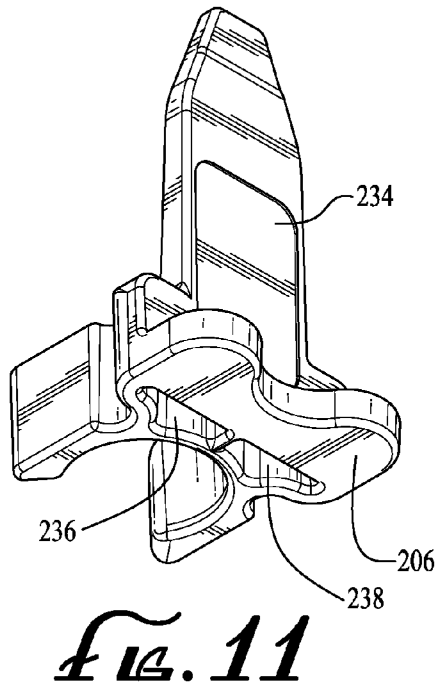
FIG. 11 is a perspective view of the FIG. 10 walker lock taken from the bottom, left side.
Figure 12:
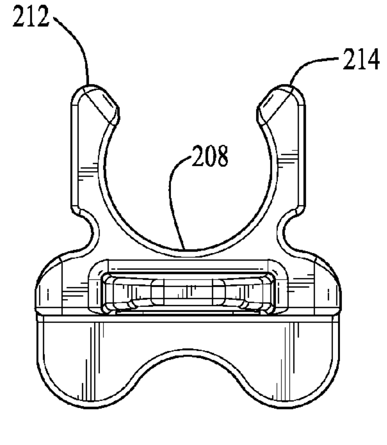
FIG. 12 is a top view of the FIG. 10 walker lock.
Figure 13:
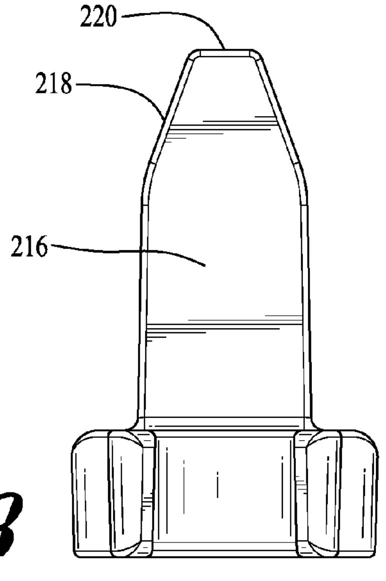
FIG. 13 is a front view of the FIG. 10 walker lock.
Figure 14:
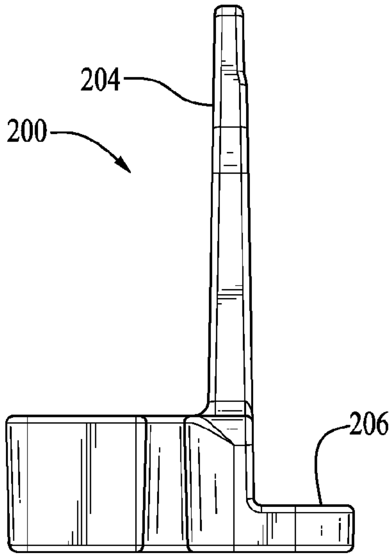
FIG. 14 is a left side view of the FIG. 10 walker lock.
Figure 15:
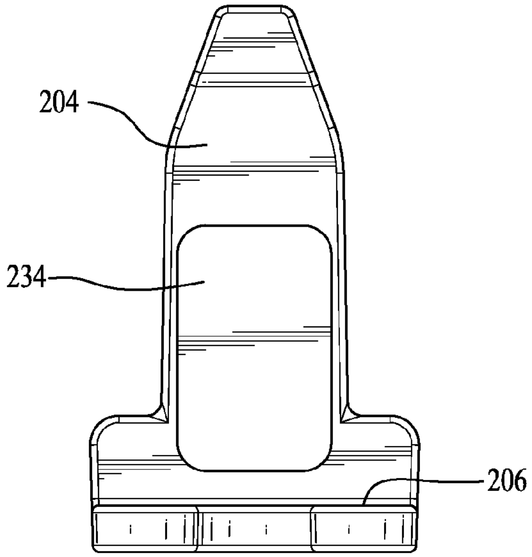
FIG. 15 is a rear view of the FIG. 10 walker lock.

The projection 72 preferably has a generally rectangular area 84 adjacent the base 70 and that tapers to a truncated top area 86 that terminates at a flat, distal end 88. When the walker is in a folded position or configuration, with the segmented rods 30, 32 rotated about their pivot points so that the walker is collapsed into its storage configuration, with rear leg 60 rotated forward and up against the front leg 56, the lock can then be moved from its unlocked position to its locked position. To do so, base 70 of the lock, clasped around a walker leg, is moved upward so that projection 72 moves into an open area or channel region formed by the two sides of the hinge or leg extension 58 on the left and right, respectively, and by the two legs of the walker on the front and rear, respectively. The leg extension 58 is formed by two leg extension members 98, 100, as shown in FIG. 9. These two leg extension members extend, preferably at about a 45° angle from the front legs of the walker and function to provide an offset hinge or pivot point 90 about which the rear leg may rotate. Rotation of the rear leg then cooperates with the other components of the walker, particularly the hinges rods 30, 32 to collapse the walker from the use configuration to a storage configuration. Extending through the pivot point is preferably a threaded bolt that is retained at one end by nut and functions to provide an axle about which the rear leg 60 rotates. Once it is moved to inside of the channel or space formed by the walker legs and the leg extension members, the projection 72 fills up the space thus prevents the rear leg 60 from rotating backwards to unfold the walker. In other words, by preventing the rear leg 60 from rotating forward, the projection piece in combination with the block 70 functions to lock the walker in its storage position. Thus, the lock 54 locks the walker in its collapsed, storage position and prevents it from spontaneously opening up when a user or caregiver moves the walker from a storage location, such as for example the trunk of a car.

Figure 7:
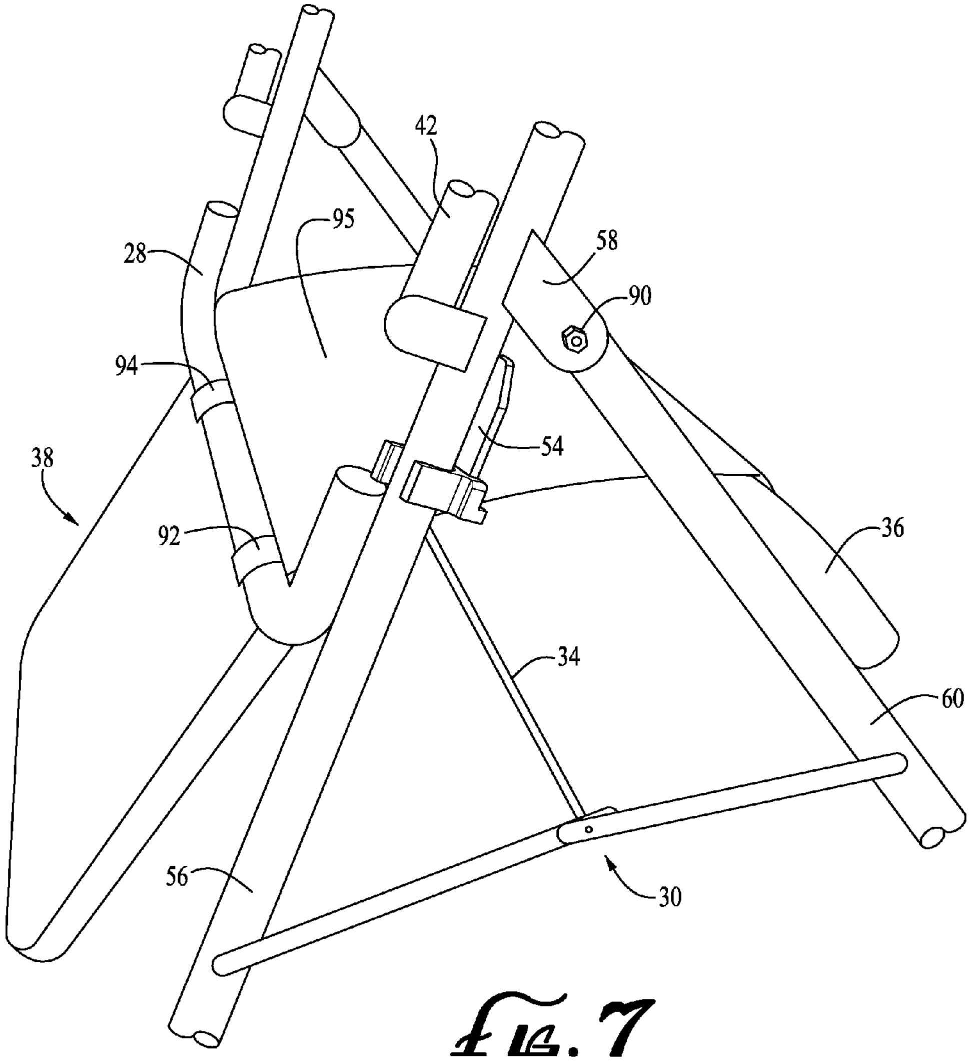
FIG. 7 is close up, partial perspective view of the FIG. 1 lockable lock as it is beginning to be collapsed and locked in a storage or non-use position.
Figure 8:
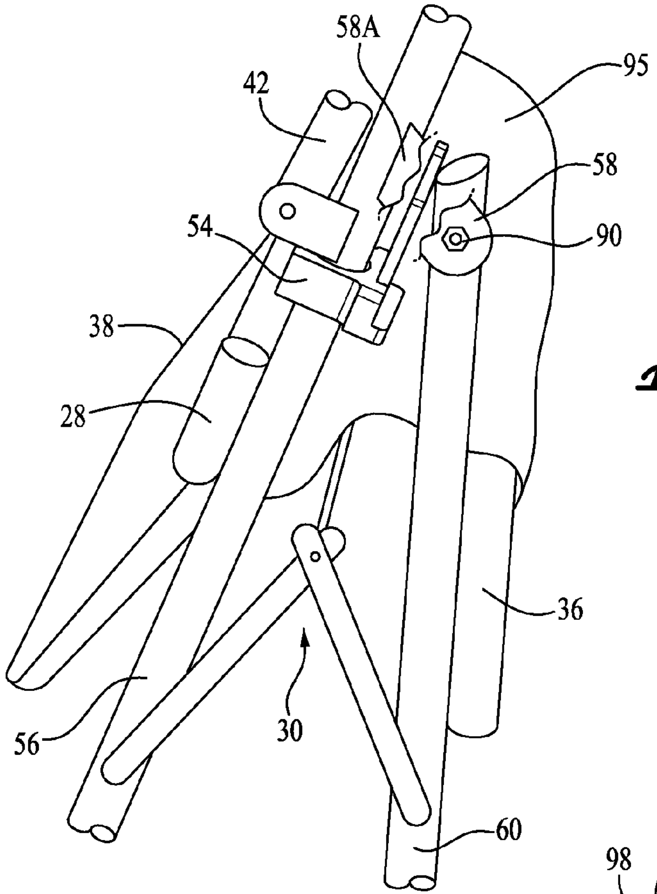
FIG. 8 is a close up, partial perspective view of the FIG. 1 lockable lock in its collapsed and locked position.

Referring primarily to FIGS. 7-9 operation of the walker lock will be described further. FIG. 7 illustrates the walker as it is being prepared for storage and locking. Seat 38 is rotated forward, but remains attached to front seat cross beam 28 at attachments 92, 94. These attachments can be of any conventional design, such as rings that permit the seat to rotate about the beam 28 while retaining the seat on the beam. Also shown in FIGS. 7-8 is a fabric 95 that extends from the front seat support beam 28 to the rear seat support beam 36 and from the left side to the right side of the walker. The segmented support rods at 30 have begun to collapse by rotating about their pivot axis that coincides with the centerline of the cross support rod 34. At this time the rear leg 60 rotates about its pivot 90 toward the front of the walker, and begins to open up a space between the two leg extension members. The top end of leg 60 is angled as shown in FIGS. 8-9. The pivot 90 is shown in FIG. 7-8 as a conventional threaded bolt and washer, but could be any other structure that functions to permit rotation of the leg 60. The leg extension 58, with its right or first extension member 100 and its left or second extension member 98 provides for an offset hinge so that the walker can be collapsed and so that the front legs of the walker can extend upward above the leg extension to provide a mounting structure for the handle and upper brake assembly.

In FIG. 7 the lock 54 is shown clasped onto the left front leg 56, but its projection 72 is below the leg extension 58. As the user or health care provider slides the lock 54 along the leg 56 toward the leg extension 58, and as then shown in FIGS. 8-9 the projection 72 is inserted into the space, region, opening or channel formed by the leg extension members 98, 100 and the front and rear walker legs 56, 60. When in the locked, storage position with the rear leg 60 fully rotated forward, the top of the leg 60 abuts against shoulder 74. With the preferred lock structure it is the shoulder 74 that absorbs the majority of the compressive force generated by the leg 60 acting as a lever arm when any force is exerted to close or collapse the rear legs against the front legs of the walker. In the event the walker spontaneously attempts to open up, the leg 60 also acts as a lever arm through pivot point 90 but in the reverse direction. In that instance it is the projection 72 of the lock 54 that absorbs the force, blocks movement of the leg 60 and prevents the walker from opening. When a user or health care giver wants to unlock the walker, the lock 54 is simply moved down along the leg of the walker until the projection 72 is no longer within the space or channel formed by the leg extension members 96, 98 and legs 56, 60. Then the leg 60 is rotated and the top of leg 60 fills up the space formerly filled by projection 72.

With reference to FIGS. 10-16 a second, alternate preferred embodiment 200 of a walker lock will be described. The lock 200 is of the same general form, may be made of the same materials and performs essentially the same functions as does the lock embodiment 54. Lock 200, however, has some structural and ornamental differences, the structural differences of which provide several additional advantageous features in comparison to the embodiment shown as lock 54. Lock 200 includes a base 202, a projection 204, shoulder 206 and a contour 208 for grasping or clasping around a leg of a walker. The bottom part of the U or contour area 208 extends around to a pinched or narrowed area 210, through which a leg of a walker passes upon installation of the lock on the walker. The lock 200 also includes distal ends 212, 214 to define the ends of the U-shaped part of the lock that functions to hold the lock onto a leg of the walker. Lock 200 also includes a rectangular area 216, a truncated top area or region 218 and a distal end 220 at the top of the lock.

Lock 200 also includes some structures and ornamentation not included with lock embodiment 54. For instance, lock 200 includes recesses or cut-away regions 222, 224 on the base 202. These cut-away regions are preferably curved and function to provide recessed areas for fingers or thumbs of users to better grasp the lock during lock placement onto the leg of a walker or during removal of a lock from the leg of a walker. Other cross-sectional shapes, of course may be employed to provide the same or equivalent functions. The distal end region of the U-shaped part of the base of lock 200 also differs from the distal end region of lock 54. As shown best in FIGS. 12 and 16, the distal ends have a rounded contour or end, one of which is shown at 226. Preferably, both distal ends have the same, rounded contour as each other. The rounded, contoured distal ends of the legs of the U-shaped base function to facilitate guiding the lock over the leg of the walker. Also, as will be apparent to those skilled in this field, different contours and radii of curvature may be used to form the out, distal ends of the legs of the U-shaped base of the lock 200. The distal end regions of the base of lock 200 also, preferably have a cut-away portion, one of which is shown at 228, as compared to the corresponding area of lock 54. In lock 54 the inner, distal end region if formed by the base walls meeting at a 90° angle. In contrast, the corresponding region of the base in lock 200 has had part of the base material removed, such that the corners have been cut-away. This leaves the end of the walls joined by a short wall section that in turn forms an angle of less than 90° with each of the two walls at the inner, distal end region of the legs of the U-shaped base. These truncated or cut-away regions also function to facilitate placement of the lock 200 around and over the leg of a walker.

Figure 16:
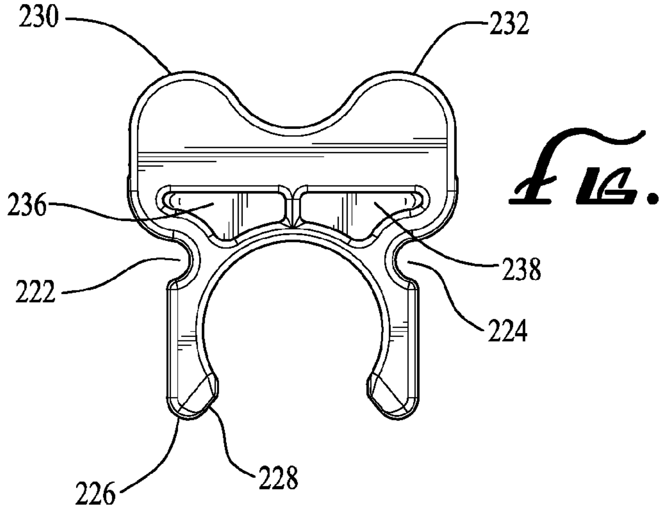
FIG. 16 is a bottom view of the FIG. 10 walker lock.

Walker lock 200 also has extended, rounded tabs, or "mouse ears" 230, 232, best shown in FIG. 16. The rounded tabs 230, 232 extend outward, backwards from the lock at a distance greater that the extension of the shoulder 74 in the lock 54. The tabs 230, 232 function to provide a larger structure for a user to hold on to the lock 200 and to facilitate placement of the lock onto a leg of a walker or remove the lock 200 from the leg of a walker. Lock 200 also includes a removable product information tab 234. The tab 234 may be used for placement of product identification and other information regarding the lock, and may be replaced with a difference tab having different information should new information about the lock 200 become available. As shown in FIG. 16, lock 200 also includes recesses, or hollowed regions 236, 238. These hollowed areas are for facilitating the manufacturing of the locks, functioning to minimize shrinkage and/or to save on material of construction. As will be appreciated by those skilled in this field other shapes may used for such cavities.

The above preferred embodiments have been described, for convenience, with reference to a single lock placed on and operated from the left, front leg of a walker. It is readily apparent that such a lock could be employed on the other side of a walker, on both sides of a walker and on the rear leg or legs of a walker, or above the leg extension so that the lock would be moved downward to lock and upward to unlock.

Although specific embodiments of the invention have been described, various modifications, alterations, alternative constructions, and equivalents are also encompassed within the scope of the invention.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A lockable walker comprising:

a walker having a left frame assembly having a bottom end and a top end, operatively connected at its bottom end to a front wheel and to a rear wheel, a right frame assembly having a bottom end and a top end, operatively connected at its bottom end to a front wheel and to a rear wheel, and at least one support member connecting said left frame assembly to said right frame assembly;

a seat mounted between said left frame assembly and said right frame assembly;

said left frame assembly including a generally tubular left front leg having a pre-determined outer diameter and a generally tubular left rear leg, said left rear leg rotatably connected to a left leg extension and said left leg extension connected to said left front leg near said left frame top end;

said right frame assembly including a generally tubular right front leg having a predetermined outer diameter and a generally tubular right rear leg, said right rear leg rotatably connected to a right leg extension and said right leg extension connected to said right front leg near said right frame top end;

said left leg extension having a first end connected to said left front leg, a pivot end rotatably connected to said left rear leg and a predetermined length; and, a lock comprising a base and a projection extending at an angle of about 90° from said base;

said base including a U-shaped end having a closed end and an open end with two legs, said closed end having a radius equal to or slightly greater than one-half of the pre-determined outer diameter of any one of said left front leg, said right front leg, said left rear leg or said right rear leg, and said open end having a distance between said two legs that is less than the predetermined outer diameter of any one of said left front leg, said right front leg, said left rear leg or said right rear leg;

wherein said lock further comprises a shoulder extending from the base at an angle of about 180° from said base, said base having a pre-determined height and said shoulder having a height less than said pre-determined height of said base and, said lock movably retained on any one of said left front leg, said right front leg, said left rear leg or said right rear leg.

* * * * *